J. E. BLOOM.
ELECTRICAL PROCESS AND APPARATUS FOR COMPOUNDING LIQUIDS WITH GASES OR OTHER COMPONENTS AND THE PRODUCTS THEREOF INCLUDING CARBONATING BEVERAGES.
APPLICATION FILED SEPT. 30, 1919.
1,338,352. Patented Apr. 27, 1920.
2 SHEETS—SHEET 1.
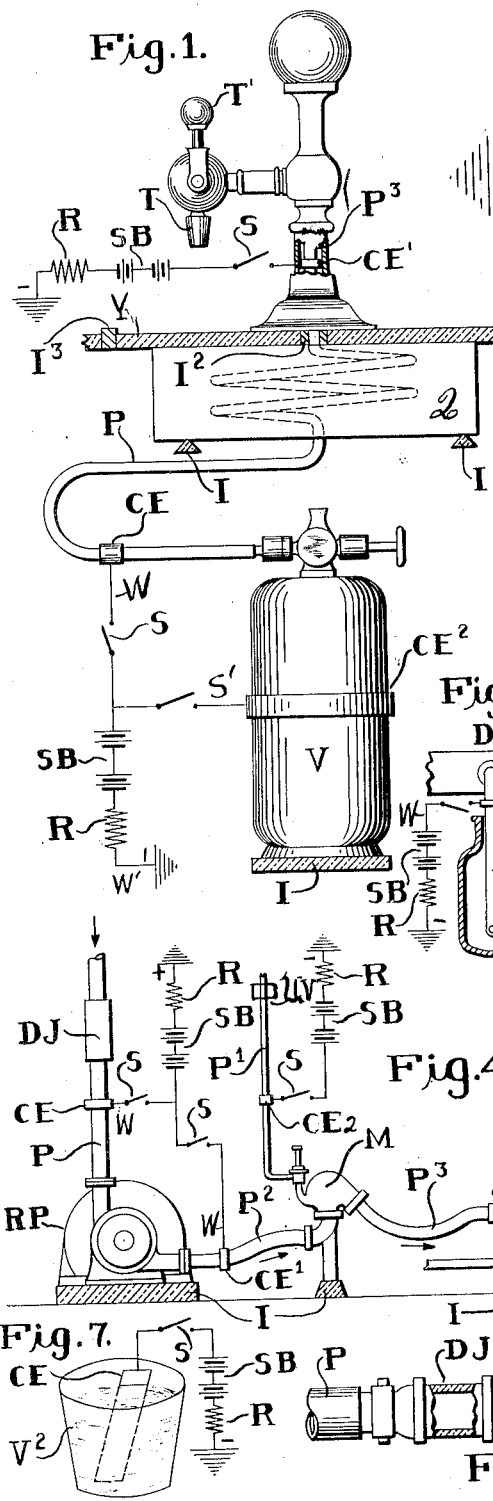
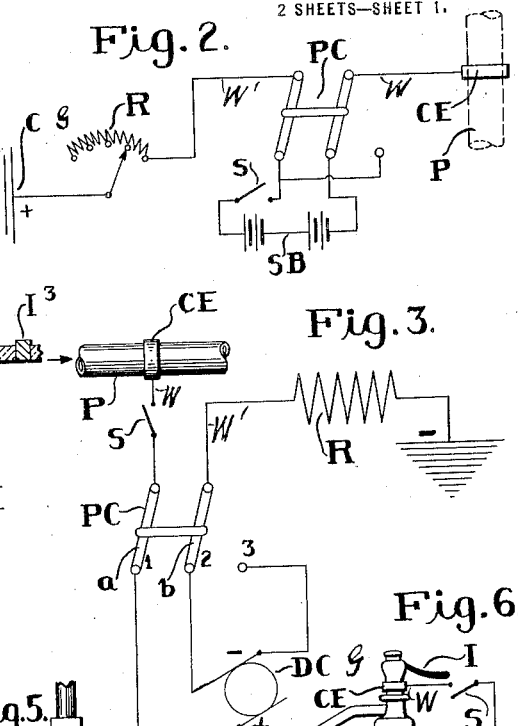
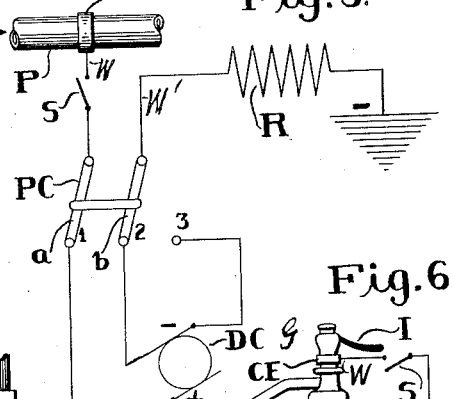
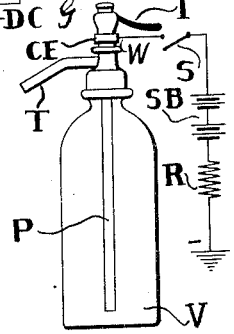
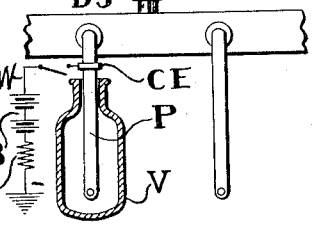
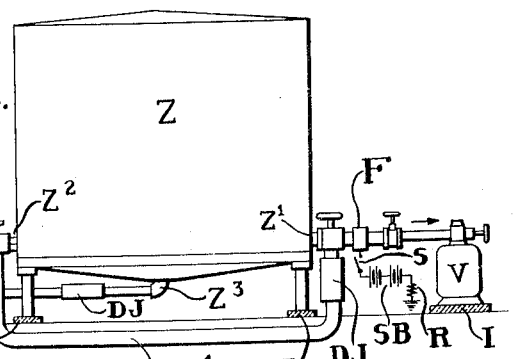
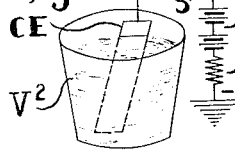
INVENTOR
J. E. Bloom J. E. BLOOM.
ELECTRICAL PROCESS AND APPARATUS FOR COMPOUNDING LIQUIDS WITH GASES OR OTHER COMPONENTS AND THE PRODUCTS THEREOF INCLUDING CARBONATING BEVERAGES.
APPLICATION FILED SEPT. 30, 1919.
1,338,352. Patented Apr. 27, 1920.
2 SHEETS—SHEET 2.
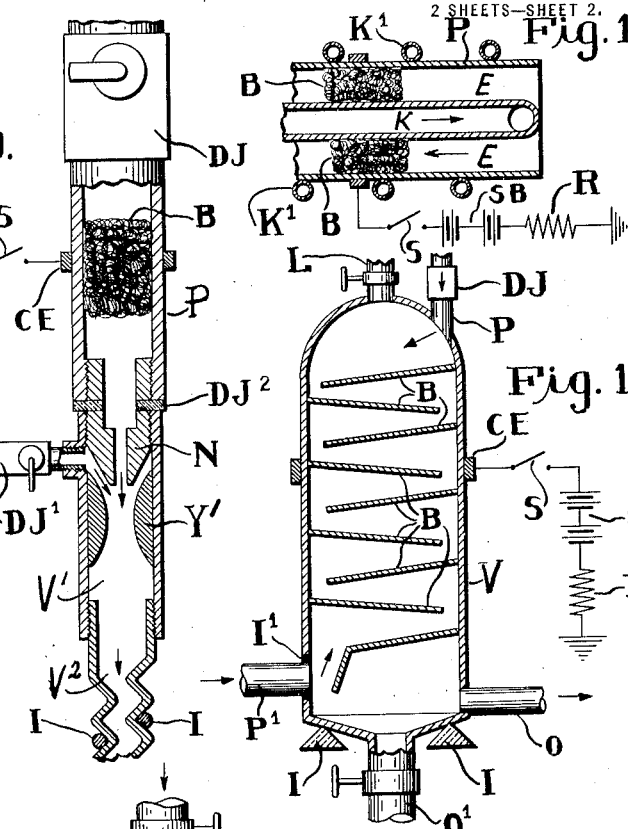
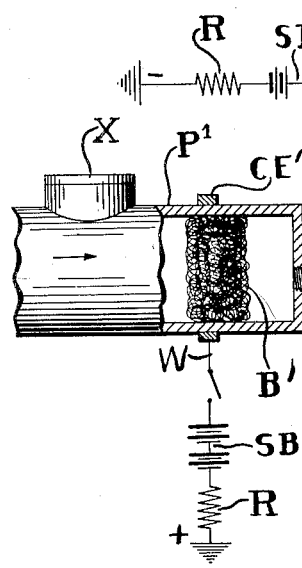
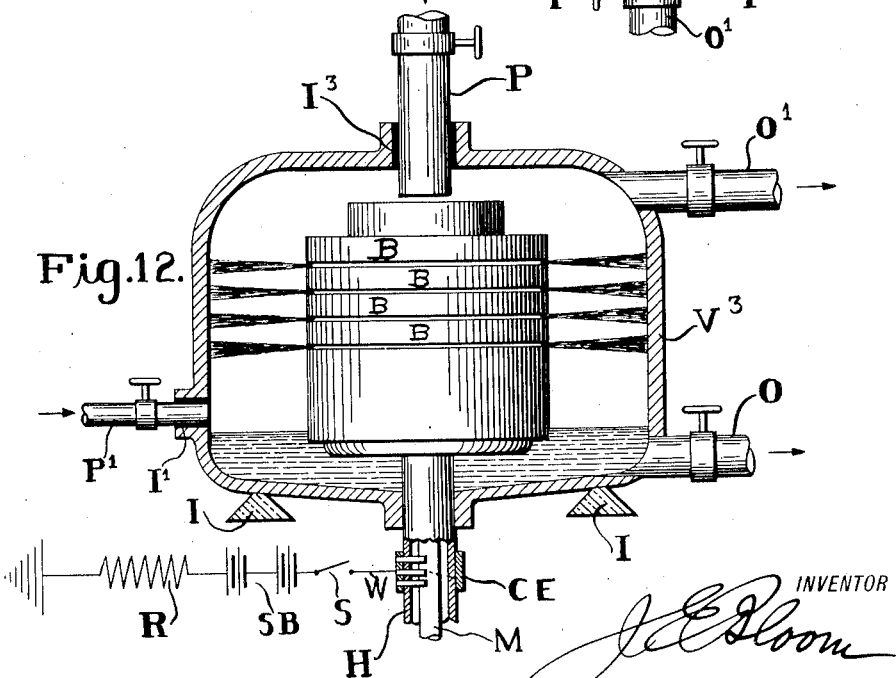

UNITED STATES PATENT OFFICE.

JACOB E. BLOOM, OF BROOKLYN, NEW YORK.

ELECTRICAL PROCESS AND APPARATUS FOR COMPOUNDING LIQUIDS WITH GASES OR OTHER COMPONENTS AND THE PRODUCTS THEREOF, INCLUDING CARBONATING BEVERAGES.

1,338,352.      Specification of Letters Patent.      Patented Apr. 27, 1920.

Application filed September 30, 1919. Serial No. 327,579.

*To all whom it may concern:*

Be it known that I, JACOB E. BLOOM, a citizen of the United States, residing at Brooklyn, city of New York, county of Kings, State of New York, have invented certain new and useful improvements in electrical processes and apparatus for compounding liquids with gases or other components and the products thereof, including carbonating beverages, of which the following is a specification.

This invention relates to an electrical process of preparing compounds of liquids with other components either gaseous, liquids or solids; and the electrical apparatus therefor; and is illustrated herein by the electrical preparing of liquid solutions with gases, or the absorbing, dissolving or impregnating or carbonating of beverages, and the like with gases; and has for its objects the attaining of the compounding by electric attractive forces or stress including electric adsorption, electric reaction forces in addition to ordinary adsorption and absorption and chemical affinity or the like; and to attain a more stable compound product; and if desired an increased amount of gas in the compound; and in some cases, a product comprising electrically charged components or particles. Other objects are set forth in the specification and claims.

By the term electrification or electrifying or electrically charging a liquid or a component thereof, and the like herein, I mean the conferring thereon, or therein, upon many of the particles thereof or of the components thereof, an electrical charge either positive only or negative only, in static state, and without any resulting electrolysis, and irrespective of or in addition to any charge or formation of ions and the like by mere solution or charges on colloids by mere solution, and the like.

As a process, my invention consists in preparing compounds of a liquid with other components, gaseous or liquids or solids, by electrifying the liquid with one electric sign only, advantageously with other liquid or solid components dissolved therein; and advantageously while moving; and then compounding or mixing same, thus electrically charged, into intimate moving contact with the gases advantageously under pressure, and either neutral or advantageously previously ionized and electrified with the opposite sign and with greater potential advantageously in the position electrifier; and finally advantageously electrifying the product with one sign only, packaged in dielectric containers; and all under insulated conditions; and with alternative modifications, as further recited herein.

In general, I attain such electrification by bringing the materials of one component of a proposed compound, and also advantageously the product, under insulated conditions, into contact with an electrical conducting surface, or a conduit or tube or plate or vessel or chamber, or the like, and which surface I call an electrifier, electrically connected with what I call the electrifying apparatus by insulated wire, with one pole or terminal of or lead wire from a direct or constant current supply, of suitable voltage and amperage; being the pole of same sign, positive or negative, desired to be attained; the other pole or terminal of the circuit supply being simultaneously earthed; and advantageously with rheostat in the circuit; and simultaneously in some cases treat another component as for instance, the gas, separately advantageously ionized and additionally electrified or surcharged, in analogous manner with an electrifier of opposite sign to the above; and thereupon compounding the two under insulated conditions.

In the conduct of my process for liquid solutions, carbonated beverages and the like, compounded or mixed with gases, I thus electrically charge with one sign only, the principal component, as for instance, the plain liquid beverage advantageously negative, and then compound substantially as at present with the neutral gases $CO_2$ but under insulated conditions; or as an alternative, I also separately ionize and electrify the $CO_2$ under pressure, advantageously positive, and with a greater potential in the electrifier and then compound the oppositely charged two components as at present, but under insulated conditions.

And where more than two components are to be compounded, I first electrically combine as above, any two components, one at least being a liquid and thereafter similarly electrify and compound such product, with a third component; and so on with other components. And finally where the final product is packaged in dielectric containers such as glass bottles, or glasses and the like, I similarly advantageously electrify the product, i. e., the final compound with one charge only, advantageously positive for beverages; or negative for non-beverage liquids.

And in attaining such electrification by contact, and to increase such by leakage of positive electrons or negative electrons only, I advantageously provide means to attain a material difference of potential in the D. C. supply of suitable voltage between the contact electrifier surface or a point nearby in the lead line (being the extension of one terminal of the D. C. supply), and the source of electrical supply; and I advantageously so do by placing a resistance or a rheostat with or without an ammeter in said line, advantageously near electrifier; or otherwise increase the difference of potential in the direct current suply, between the source and the electrifier at or near the points of contact.

And in order to attain an extension surface of contact between the moving materials and the electrifier surface or conduit, I advantageously provide in the conduit, a species of baffles in electrical touch with the conduit, and thus constituting resistance in the circuit and over and through which the liquids or gases flow; under insulated conditions.

In the process and apparatus set forth in my applications for patents Serial Numbers 205,228 and 205,229 filed December 3d, 1917 and 250,814 filed August 21st 1918 pertaining to electrical treatments, etc., I apply and use alternating current fields, from A. C. supply, in contact with materials being treated, whereas in this present application, I use direct current supply and the like only, and ground either the positive only or negative only, from the D. C. supply. The D. C. supply and electrifying apparatus herein may be likewise applied in the aforesaid process and product inventions or patents applied for in lieu of the A. C. therein described.

This invention in general adapts and practically applies with improvements the electric principles and theories heretofore demonstrated that when particles are brought, under insulated conditions, into contact with only the one pole or terminal or its extension, of a direct current supply, and the like, of a sufficiently high voltage and amperage, then the said particles will take up or become electrified with an electric charge of the same sign as the said contact pole; and with a varying degree of rapidity depending principally upon their electric and electrostatic capacity, resistivity or conductance, and in some cases pressure and temperature; and likewise from a frictional electric supply, or frictional contact.

And further when particles oppositely electrified or charged or in static opposite states are brought into contact, a combination thereof results by electrical adsorption or electric chemical reaction or the like with neutralization of some or all of the charges.

Aud further when electrified particles meet neutral particles, the latter may take up some of the charge from the former or may be electrically adsorbed or combined with the former including where the kinetic energy of agitation or motion or pressure is sufficient to counteract the repulsion between two particles charged alike.

By the terms compounds or product or compounding, I include solutions, blends, combinations, mixtures, adsorptions, hydration, solvation, chemical reactions, and the like; and the vessel or chamber where such is brought about, I call a compounding chamber or vessel or compounder.

By solution, I include herein, both true solutions, in which there is no chemical action between the gas and the solvent or liquid, i. e., compounds or mixtures which do not act chemically on each other; and also solutions wherein there is part hydration or solvation; and also solutions wherein chemical or ionic combination or action takes place as distinguished from physical action or molecular association; and also the latter type of solutions; and the like.

As a product, my invention comprises a liquid compound or beverage and water and the like, with electrically adsorbed gases such as carbonic acid gas, in addition to ordinary absorbed gas; and further in some cases, having electrically combined chemical reaction components; and with increased amount of solvation or hydration compounds having enhanced stability; and advantageously in some cases such product being further electrified with one sign only, in static state; i. e., either positive only or negative only, advantageously positive for beverages and negative for non-beverages, in dielectric containers.

Reasoning by analogy the following theory is advanced in connection with the utility of the electrified product, to wit:

An electrified beverage or liquid may be considered as a system of charged bodies, i. e., atoms or molecules of sundry components in solution which components may be conductors surrounded by a dielectric i. e., water molecules. The former as well as the latter may take up a charge by contact resulting from movement and agitation forcing same against an electrifier pole or plate as herein explained, and thereafter by contact against each other, all under insulated conditions. And in a subsequent dielectric container, i. e., a glass bottle, such latter transfer of a charge by contact from one particle to another due to any agitation continues. And when such beverage is consumed by man the dielectric envelop continues to protect and insulate the charge on some of the beverage components which may continue in the human system until the components are assimilated therein, by due compounding or contact in the body cells with oppositely charged elements; as for instance most germs and toxins therefrom are electro-negative in the body fluids; if such meet electro-positive atoms or molecules, the beverage in the circulatory human system or in tissue cells, there will ensue combination of the oppositely charged elements, with possible precipitation of toxins and the like, and with subsequent elimination with other waste. It is therefore advantageous to electrify the beverage positive. It is thereby endowed with a distinct potential which I term an "electric kick." Even though this theory of electric action in the body cells like many electrical theories can only be regarded as theory at present, yet such has been demonstrated *in esse*. i. e., as regards the combining of oppositely electrified particles.

On the other hand, non-beverages are advantageously electrified negative, as such aids in the preservation or non-spoiling quality; and is likewise advantageous for beverages not intended for immediate consumption.

As an apparatus this invention consists of a conductor conduit, pipe, plate or vessel or chamber thereof, or baffles therein which I term the electrifier with insulator supports; with means of electrically connecting the electrifier with one pole of a direct current supply of suitable regulable high voltage and amperage, the opposite pole being simultaneously connected to earth; and advantageously with a rheostat or resistance in the D. C. supply advantageously near the electrifier; or with the electrifier advantageously made of resistor material; with means of continuously or intermittently forcing into contact with the electrifier, the liquids, fluids, gases and the like, under insulated conditions; with means of regulating and controlling the temperature and pressure and the time of contact or velocity of flow or the repetition thereof; all under insulated conditions.

And advantageously with means of withdrawing the product from the electrifier conduit into dielectric containers continuously or intermittently, under insulated conditions; and advantageously with electrifying means, similar to the above for electrifying the product in dielectric containers with positive or negative charges only, through electrically connecting the product in the container or pipe leading thereto, with one pole only of a direct current supply, the other pole being earthed.

And advantageously with alternative means, in lieu of one electrifier conduit, of having a double or two parallel or concentric similar conduits or plates, electrically connected together with narrow passage-way, with baffles advantageously between the two, and means of forcing liquids and gases through such narrow passage-way under insulated conditions.

And advantageously with a suitable filter in the exit piping between the final electrifier conduit and final container of the product and advantageously electrically connecting the filter supported by insulators with electrifier apparatus as above, i. e., with one pole only of a D. C., supply, the other pole being earthed.

And advantageously with alternative means, of injecting and spraying the liquid into a closed electrifier compounding vessel or insulator supports through a spray insulated injector nozzle electrically connected as aforesaid with one pole only of a D. C., supply, the other pole being earthed.

And advantageously with alternative means, of injecting the gases under suitable pressure into the liquids sprays in the compounding chamber through an insulated electrifier twyer nozzle advantageously electrically connected with one pole only of a D. C., supply, the other pole being earthed, the former pole being opposite in sign to the liquid or spray nozzle and advantageously previously ionizing the gases by well known means.

And with alternative means of passing the liquids and gases separately and simultaneously into a closed compounding chamber through an electrifier conduit sprayer for liquids and an electrifier conduit twyer for gases respectively, of opposite signs, and meeting in a compounding chamber or tube or the like, advantageously neutral; with means of withdrawing liquids, vapors and gases from the compounder, all under insulated conditions.

And advantageously with alternative means, of passing and forcing separately, the liquids and gases into and through a centrifugal emulsor machine, bowl or similar centrifugal radial acting machine, advantageously with revolving parallel truncated cone or disk plates with very narrow spaces or passage-ways therebetween, with means of centrifugally forcing and passing the liquids therebetween, and the spraying thereof into a surrounding fixed bowl with means of forcing gases into and mixing with the spray in the bowl; with insulator supports for the machine; and with the bowl and disks and passage conduits to the latter electrically connected with one pole of a D. C., supply, the other pole being earthed as above described.

And advantageously of previously passing the gases duly ionized through an insulated electrifier pipe electrically connected with one pole only of a D. C., supply, the other pole being earthed,—the former being charged of opposite polarity to the disks; all under insulated conditions.

In the electrifier conduit or tube or the like, I advantageously insert what I call an electrifier baffle or break or spreader, with many interstices for passageways, such as a bundle of inter-twisted flat wires or coarsely woven wire screening or an Archimedean screw or iron sponge or steel shavings or the like, or comminuted solid metal catalyzer in electrical contact with the tube; or like the cascade plates of an absorber; permitting a ready passage of the liquids or gases therethrough, and thereby extending the contact electrifier surface, materially. Such baffle or bundle of wires within and in touch with a metallic electrifier tube or the like, will be a part of the conductor extension of one terminal of the direct current circuit, and also constituting a resistor in the circuit and in some cases as a catalyzer. And if the conduit be a dielectric, then the metal baffle is to be directly connected with the terminal, in other words, where present vessels are to be utilized for compounding, which are of said baffles of conductor material and electrify the latter as aforesaid; and it will be understood that such baffles and the like, also act like and constitute resistance in the circuit,—increasing the difference of potential at the contact. The surfaces of contact of the plates or tubes of the electrifier are advantageously roughened to attain numerous edges. the object being to attain concentration and high density of the electric stress at and contact discharge from the edges for the positive electrons or the negative electrons into the passing liquids and material, and vice versa.

I advantageously further facilitate the latter effect, i. e., the contact discharge or passage of electrons from the electrifier tube into the liquid or vice verse, by advantageously placing a rheostat or resistance in the D. C. circuit line advantageously near the electrifier extension of terminal; or by making the electrifier itself of resistor material; or doing both.

By the term baffle, I include not only the ordinary usual meaning of a baffle plate but also such above bundle of wires and the like acting as resistance in the conduit electrifier; I also include Archimedean-screw-like and turbine-like devices, agitators, paddles, deflectors, cascade plates,—or other analogous and agitating devices in electrifier vessels in the D. C. circuit and which also aid in attaining intimate mixing of liquids and gases therein and the breaking up into small globules or particles, and the contacting of such with the contact electrifier and with each other thereafter.

By the term electrifier, I include not only a conductor plate or conduit, which may be a metal tube, cylindrical or ellipsoidal, square or rectangular, and advantageously longitudinally U-shape; but also include a metal vessel or chamber into which water or liquid or beverage can be or is now injected or sprayed, with or without gases under pressure; also any metal vessel or emulsor in which liquids can be agitated with gases under pressure, and periodically intermittently or continuously withdrawn; all under insulated conditions.

As such electrifier, I also adapt or include vessels and tubes or apparatus now in use in sundry compounding arts, as for instance, in the present apparatus for carbonating beverages; and I so do by supporting all such on insular supports such as porcelain or stoneware and the like; and by electrically connecting with wires, the metal parts with one pole only of a D. C. supply and earth the other pole.

And advantageously for further complete insulation, in some cases I insert in the entrance or exit pipes to or from the compounding chamber, or both, I place a joint or section of dielectric conduit pipe with cut-off valve and cock.

Though I utilize and adapt existing vessels, vats and the like, of metal, as now used in the art, it is advantageous from the standpoint of economy of current supply, to use vessels and vats and the like, of stoneware or china or a dielectric excepting for the electrifier itself and for the reason that a much larger quantity of current must be provided to saturate the large amount of metal in a metal vessel, than where a dielectric vessel is used, and the electrifier alone made of conductor or resistor material.

Though I may use for making the electrifier any conductor or resistor material, advantageously acid proof and non-oxidizable, yet, when the principal use thereof is to confer positive electrification, I advantageously make the electrifier baffle or plate or portion of tube and the like of what is called electro-negative metal, including pure iron, copper or steel or nichrome steel; and to confer negative electrification I advantageously use what are known as electropositive metals such as tin, pure silver or nickel or lead or an alkali alloy or oxids of metal; or of carbon or graphite; and most advantageously for both the former and the latter, I use a resistor-material such as German-silver, or copper manganese alloy or copper nickel alloy=Monel metal, or nickel steel or nickel chromium, the portion of the conduit or tube or the like other than the electrifier being then advantageously made of a more superior conductor, the contact plate or section or joint of the tube used for electrifier contact being advantageously alone made of resistor material; and with the object of having such act as a resistance in the circuit, and thereby increase the difference of potential between it and the electric source; and thereby facilitate the passage of electrons into and from the moving liquids or gases in contact therewith, under insulated conditions; but where the heat thus generated is objectionable then I make the electrifier of conductor material and place resistance in the line outside of the vessel.

In sundry compounding of liquid with gases or other liquids, sundry solid or comminuted metallic catalysts are advantageously used where high temperatures are permissible or not injurious to the product. Any such are advantageously used also as material for the electrifier; in some cases where high temperatures are used in the compounding, such also constituting an advantageous resistor in the circuit, which may also act catalytically, electrically activated; and also as an adsorbent electrically activated; to act upon the liquids and gases moving in contact therewith, under insulated conditions.

As a source of electricity for the electrifiers, I use any present direct current supply advantageously constant. I advantageously use an insulated battery of large accumulators or storage cells, such as are now commercially available with means of connecting several to attain and control any suitable voltage and amperage, advantageously 1200 v. upward for the negative and 2400 v. upward for the positive electrification, or the latter advantageously exceeding the former over 50 v.; and with a continuously renewed amperage advantageously over 50. Or I use a D. C. standard constant generator; or a standard lighting and power supply; or I use a rectified or duly converted D. C., from an A. C. supply; or I may use a battery of dry cells advantageously connected in regular multiple series; or I use current from a frictional or influence machine and the like. By direct current supply or circuit, I mean a metallic circuit of which the earth forms no part. It will be understood that I use well known means, not shown, to raise the voltage of any available supply to the above high voltage, or as may be advantageously empirically determined.

I illustrate my process, apparatus and product specifically as applied in carbonating beverages, though it will be understood that similar process and apparatus pertain to many other compoundings.

By carbonating is understood the impregnation of a beverage in a hermetically sealed container with carbonic acid gas, $CO_2$ to give it effervescence or foam, when the pressure in the container is released, i. e., when a glass bottle is uncorked. Ordinarily such foam up abundantly, and then rapidly become "flat". My improvements prolong the time before becoming flat due to the electric adsorption.

Carbonated beverages are now ordinarily made by impregnating a plain beverage with carbonic acid gas at high pressure usually 30 atmospheres for bottles and 50 for casks; usually with 3 to 4 volumes of gas to 1 volume of liquid; likewise the artificial mineral or aerated waters.

Beverages known as "soft drinks", including "ginger ale", sarsaparilla, near-beer, lemonade, soda fountain drinks, etc., ordinarily consist of a decoction or extract with water, sweetened; some rendered "tart" by the addition of an acid usually citric or tartaric or phosphoric; then flavored; and finally impregnated with carbonic acid gas, usually at low temperatures, and under pressure. Or the beverage may be a fruit syrup, finally mixed with a carbonted water as at a soda fountain.

Another common type of beverage is a plain "soda water", such as where, at present, a concentrated solution of sodium carbonate is first placed in small quantity in a bottle, into which carbonated water is then filled. In applying my process therefor, I advantageously first dissolve the sodium carbonate in all the water, and then electrify the solution while simultaneously or immediately thereafter impregnating with the neutral or opposite electrified $CO_2$ gas, all under insulated conditions. Likewise, with all beverages; I advantageously first dissolve or make a solution of or a blend with the water or other solvent, of all components or most thereof, other than the gas; then electrify the solution either before or simultaneously while impregnating with the gas.

By the term beverage, I also include the fruit beverages such as grape juice, cider, and the like; and also the fermented products including light wines, vinegar, and the like; and all of which contain water with electrolytic or other components with electric and electrostatic capacity.

From a chemical and physical standpoint, beverages in general, comprise water with sundry electrolytes and nonelectrolytes and inorganic and organic compounds and colloids in solution and in suspension; and the particles, molecules or ions of which can be materially electrified by my process or if already carrying the charge of an ion or colloid due to solution may in some cases take up additional or surcharges. The organic compounds thereof are in general weakly dissociated or ionized and therefore there are few ions naturally present.

Upon contact between the surface of the positive electrifier conduit and the moving (under insulated conditions,) ion or neutral or colloidal or dielectric particle of the liquid or fluid, there will spread and be emitted from the former to the latter, sundry positive electrons, and from the latter to the former some negative electrons which are neutralized or grounded leaving the liquid electrified positive, in static state, i. e., no current therein; and vice versa, when the negative electrifier is used, then negative electrons are emitted therefrom and spread by contact to the liquid and some positive electrons from the liquid to the conduit, and thence to earth, leaving the liquid charged negative in static state; and without ensuing electrolysis.

The amperage of the D. C., will depend upon the amount of liquids, etc., to be electrified, and time of passage or repassage or agitation thereof or of contact with the electrifier conduit, and advantageously determined empirically starting with 50 amperes or over continuously supplied. Ions and some molecules combine with more or less of the solvent, called solvation of the ions, or with water called hydration of the ions. I increase the amount of hydration or solvation by my process. By charging the $H_2O$ positive, I attain more hydration with the cations of the solution and with negative sols or colloids; and conversely by charging the $H_2O$ negative, I attain more hydration with the anions of the solution and with positive sols or colloids. The more hydration, the less precipitation and the more stability.

It will be understood that as the liquid contacts along the surface of the electrifier, not only will particles of the liquid or components, take up similar charges by the contact and convection, but also some of its ions or particles oppositely charged by solution in the liquid may lose such opposite by neutralization on the surface in contact therewith or by earthing therefrom; and may then also take up the like surface electrification by convection or on moving to further contact; but such effect if any, can be ignored for beverages.

When the electrons are emitted from the electrifier, there is absorption of heat; i. e., the electrifier conduits are very slightly cooled. Conversely, as the liquid absorbs electrons or becomes electrified there is liberation of heat; the liquids are very slightly heated. But on account of the rapidity of flow these effects can practically be ignored. But where not so, then cooling tubes can be used. The colder the liquid menstruum, the more dissociation and the greater the number of ions especially of or from acids, bases and salts. The colder the solution, the less the velocity of the ions,— i. e. the less the conducting and electric capacity.

I use and adapt my electrifier apparatus and process in any of the present methods of carbonating; such include present compression of the gas with a force pump into liquid contained in a cylinder or cask, some with revolving agitating blades therein, and known as the Geneva or intermittent process; and also in the present continuous carbonating process wherein a measured quantity of the liquid and gas are forced simultaneously into a cylindrical or oval vessel, generally with agitating blades therein, and whence after impregnation under regulated pressure, the product is withdrawn and bottled under pressure. In such, I advantageously support the vessel, condenser or the like, used as a compounding chamber, and all other connecting apparatus, the gas generator, gasometer, pump, tanks, etc., upon insulator supports; and then electrically connect the electrifying apparatus, as herein described. And likewise in the compoundings of liquids with other materials in any art other than carbonating.

I also adapt my process in the present spray method with the pressure principle; or spraying the liquid or beverage with the one kind of electrical charge conferred either as with my system or by friction and into a compressed atmosphere of the gas, oppositely negatively charged; and I attain electrification of the liquid at and near the spray nozzle which I insulate, both by friction, and also advantageously by contact with the electrified nozzle by insulating latter and electrically connecting the insulated nozzle with the positive electrifier apparatus herein described. As a general rule the spray by friction alone is electrified positively; and therefore the gases for combining with such are advantageously electrified negatively; or may be left neutral, the apparatus as a whole being insulated. Again, in the ionization of gases by present well known methods, it has been found advantageous to inject into the gases sundry sprays, vapors and the like, to increase the number of ions. I advantageously inject such into the gases, and generally inject a component of the desired product, i. e., a part of the solution and the like. By the term gases herein and in the claims, I include sprays, vapors and the like.

I attain this invention of process and product by the means and mechanism, illustrated in diagram in the accompanying drawings, in which the same letters and numbers apply to similar parts throughout the several views, and showing applications to old structures.

Figure 1 is a part perspective and vertical section in diagram of the commercial soda-fountain on insulator supports with the application thereto of the electrifying apparatus of Fig. 2. Fig. 2 is a symbolic diagram of the electrifying apparatus with storage battery supply, for attachment to electrifier conduits, plates or vessels or compounding chambers and the like.

Fig. 3 is a diagram of symbols of electrifying apparatus using a D. C. generator and pole changer for application to Fig. 1 or old structures, in the above art.

Fig. 4 is a diagram of vertical section of apparatus for carbonating beverages, with the application thereto of the electrifying apparatus of Fig. 2.

Fig. 5 is a diagram of vertical section of a bottle filling machine for carbonated beverages with the application of electrifying apparatus of Fig. 2 thereto.

Fig. 6 is a diagram of vertical section of a siphon bottle of carbonated soda water with electrifying apparatus applied thereto.

Fig. 7 is a diagram of vertical section of a glass of carbonated soda water, with electrifying apparatus applied thereto.

Fig. 8 is a diagram of a dielectric joint with shut-off valve and cock for liquid or gas supply pipes, in Fig. 1 and the like.

Fig. 9 is a diagram of vertical section of part of a combination of liquid and gas injectors into compounding chambers not shown, with electrifying apparatus attached to the separate conduits for each and electrifier baffles of wires in the conduits.

Fig. 10 is a longitudinal vertical section in diagram of part of two parallel concentric tubes, the inner tube for attemperating fluids, the annular space between the two constituting the electrifier conduit connected with the electrifying apparatus; and with attemperating surrounding coil.

Fig. 11 is a vertical section in diagram of an absorption tower and the like with electrifying apparatus applied to baffle plate electrifiers in cascade therein.

Fig. 12 is a diagram of vertical section of a centrifugal disk, emulsor or the like, with the electrifying apparatus applied thereto.

Fig. 1 illustrates in perspective, diagram of the electrifying apparatus whereof one form is shown in Fig. 2, as applied to the ordinary commercial soda fountain apparatus, of Fig. 1, as the electrifier, to wit: the carbonated water cylinder or portable steel fountain V and its supply piping P therefrom, to the refrigerator or cooler Q, thence through the counter or table Y, to the counter-draft stand or faucet tap T, with handle or fountain cock $T^1$, which is either of porcelain or covered with insulator. I insulate the whole, by placing insulator supports as of stoneware or ebonite or the like, I, under and supporting the cylinder V, and likewise to support the refrigerator or ice box Q, and at point where the piping passes through the counter, I place insulating ring or wedges $I^2$, and if the counter be not of marble or varnished wood, or a dielectric, then I place dielectric strips $I^3$ on each side of the stand, about 2 feet apart; and I clamp or solder to the liquid supply piping P, at any convenient exposed point, depending upon the construction of the whole fountain, the clamp CE, being the electrifier clamp, of Fig. 2, preferably advantageously clamped to pipe section P adjoining the connection with cylinder V; or to a part of the pipe not shown, in the cooler; or CE' at $P^3$ near the faucet tap, i. e., in plain view on the counter. CE of Fig. 2 is shown in Fig. 1 with wires clamped in the alternative either at P or $P^3$, the wires being advantageously of 10 B. & S., insulated, leading to storage battery SB, positive terminal and with its negative terminal connected by wire to ground through resistance R; and whereupon the apparatus is ready for operation by closing in the wire W, a cut-out switch S advantageously separate from the PC, to readily cut-out the electric supply. The entire supply-piping P which is practically insulated as described constitutes the electrifier conduit and likewise the cylinder V; as another alternative I may also connect the latter direct with CE as at $CE^2$ by closing switch $S^1$ in lieu of S.

Fig. 2 illustrates in diagram and part perspective, what I term the electrifying apparatus, to wit: a direct current supply, advantageously, an insulated storage battery SB with terminals connected by insulated wires with a pole changer switch PC and manually operated circuit breaker or cut-out switch S, all on insulator supports; and from which PC, one wire $w$ leads from one pole to a clamp CE for clamping or soldering to electrifier conduit P and the like, and I advantageously place in said wire $w$ a rheostat or resistance R; and another wire $w'$ leads from opposite pole through PC to a ground clamp CG for clamping or soldering to water pipe not shown, or other ground. The clamp takes the form like a brush holder and brush of a dynamo when it is applied to a revolving electifier as shown in Fig. 12 at CE, in lieu of fixed plates. In lieu of the clamps, I may dispense therewith and solder or braze, the wires direct to the pipes P and electrifier plates and the like. In lieu of pole changer, as an alternative means, I may omit same and connect the wires direct to positive and negative poles of electric supply, i. e., the wire W from clamp being connected to positive or negative pole, and the other pole being connected to $w'$ and thence to earth. Though the figure shows the resistance placed in the grounded terminal or earth line $w''$, which I may do, I advantageously place it in the opposite end of line CE in the non-grounded terminal line W near the electrifier plate or conduit; and likewise as regards the other figures. And it will be understood that in lieu of storage battery, I may use any other direct constant current supply.

Fig. 3 is a diagram showing a different direct current supply to wit, from a direct current generator DCG, in lieu of the storage battery of Fig. 2; and with wiring therefrom to a pole changing switch PC and a cut-out or circuit breaking switch S with wire $w$ from one pole to electrifier clamp CE and conduit E, and wire $w'$ from opposite pole to ground through resistance R, though I advantageously place R in line $w$ near CE. When the arms $a$ and $b$ of the switch PC are in touch with the buttons 1 and 2 respectively as shown, then the positive pole + is connected with the electrifier P, and the negative pole to earth; and conversely when the switch is thrown to the right so that its arms $a$ and $b$ are in touch respectively with 2 and 3, then the negative pole is connected with electrifier P, and the positive pole is earthed.

In connection with the use of resistance R Figs. 2 and 3 in the supply circuit to attain drop of potential at the electrifier contact surface, the amount of current flowing in the circuit is not diminished thereby; the volts lost equal the number of amperes multiplied by the number of ohms of the resistance. I use the ohms formula $R=\frac{E}{C}$ to determine the advantageous number of ohms resistance, E being the number of volts and C the number of amperes; and advantageously 24 ohms upward for negative and 48 ohms upward for positive. And in some cases an excess of at least one ohm for positive over that for negative electrification. I advantageously use for electrifying water solutions, about 1200 v. upward for negative, and about 2400 v. upward for positive electrifications; and for mere grounding of emissions of electrons about 50 to 100 v.

I advantageously regulate the amperage by the area of the electrifier surface of contact, advantageously providing about ten amperes or more per square foot of the contact surface per second of time of contact to attain in the moving material an electrostatic charge of one millionth of an ampere or multiple thereof, upon a molecule or ion or particle of the liquid, etc., depending upon the velocity or time of contact; and influenced also by concentration pressure and temperature, advantageously empirically determined for different materials, starting with above.

I advantageously use a contact pressure of about two pounds per square inch; and a velocity of about one inch per second.

In the conduct of my process, in general, I first electrically connect the insulated electrifying apparatus of Figs. 2 or 3 as above described, towit: clamp CE or solder its wire to the insulated liquid or similar supply conduit, pipe, plate or compounding vessel, i. e., the electrifier; and simultaneously likewise the clamp CG to city water supply pipe or other suitable earth or grounding means, and then adjust the pole changer duly connected with the electric supply so that the positive pole is connected to the supply pipe CE, i. e. the electrifier and the negative to earth, if the electrifier conduit and the passing material therein is to be electrified positive; and vice versa if to be electrified negative. Open the circuit breaking switch S, when not operating. When desirous of operating, i. e., when the cock and valve of the liquid supply pipe is opened and the liquids duly moving in the pipes, conduits, compounding chambers and the like as at present, then the switch S is closed and the electric supply is continued during the flow and while the contact of the liquid continues with the electrifier surface; and thereafter the switch S is opened, and the electric supply discontinued. Alternative modifications of the conduct of the process as recited above, are set forth in describing herein the applications of the electrifying apparatus to sundry old structures.

Fig. 4 is a vertical section in diagram of one present system of apparatus for carbonating beverages, with the application thereto of above electrifying apparatus; M represents any present or other carbonator proper or compounder, with details not shown, for mixing or impregnating or saturating a liquid or plain beverage with carbonic acid gas $CO_2$ and the like; and with insulator supports I; and leading to M is the liquid supply pipe P with insulator supports not shown and with a rotary pump RP or other liquid forcing device on insulator supports I forcing the liquid from pipe P and a supply reservoir not shown; and also the separate gas supply pipe P'; and leading from M, there is the exit pipe $P^3$ with two-way cock $Z^2$ conveying the compound liquid and gas into a storage and settling tank or vessel Z on insulator supports I; and with alternative exit pipes and cock $Z^3$ and two-way cock Z'; and through two-way cock $Z^2$ or Z' advantageously Z', the carbonated beverage is forced under due pressure into a detachable steel fountain cylinder V on insulator supports I; and advantageously through a filtering apparatus F with details not shown, on insulator supports I. The electrifying apparatus of Fig. 2 is applied in Fig. 4 advantageously to the liquid supply pipe $P^2$ as at CE and CE' as electrifier conduits advantageously connected with negative pole, or non-grounded terminal line W to charge the liquid negative, inasmuch as $CO_2$ which it meets in M is positive in water; or is previously advantageously charged positive as shown in the gas supply pipe P' with clamp $CE^2$; but it will be understood that the gas may be left neutral, but is advantageously ionized while passing through P' by a Roentgen ray ionizer UV not shown in detail, or the like. And where a filtering apparatus is used as is now often done after the carbonating, with or without a settling tank not shown, then I advantageously electrify the compound carbonated beverage advantageously positive, as it passes through filter F into receiver, cylinder V or advantageously into bottles or wood barrels; and by supporting the filter on insulators, and electrically connecting the metal parts of filter F, with the positive pole of electrifying apparatus Fig. 2, a woven metal filter plate or the like is advantageous for such purpose in lieu of other present filtering.

Where it is from any cause difficult or impracticable to insulate the reservoirs or source of supply of the liquids P, then I advantageously insert in such piping a section of dielectric piping or joint DJ Fig. 4, like Fig. 8 preceding the electrifier or CE.

Fig. 8 illustrates a longitudinal section of such dielectric joint DJ a tube made of a dielectric material glass or ebonite or the like, hermetically connected into the conductor piping, P and like connecting exterior pipes, and advantageously with two female nipples and nuts and dielectric washers with a stop-cock and valve A to cut-off the supply entirely, in some cases, while intermittently applying the electrifier to the portion which has passed into the electrifier conduit.

Fig. 5 illustrates, diagrammatically in part perspective and vertical section, part of a bottle filling machine and liquid compound conduit P for filling a bottle V with carbonated beverage; and with the electrifying apparatus of Fig. 2, duly applied as shown, to electrify the beverage positive, CE being applied to electrifier conduit P to-wit: the liquid filling pipe P as now used in such machine, the latter being mounted on insulator supports not shown; and advantageously with dielectric joint DJ in the beverage supply pipe bringing beverage to the machine.

Fig. 6 is a diagram of vertical section of the ordinary commercial siphon bottle, V, with the electrifying apparatus of Fig. 2 clamped at CE at top of siphon tube P in the present apparatus for and during the filling of same, or after the filling thereof, with the carbonated soda water; and shown so as to electrify the same positive. The operating lever of top of bottle is advantageously covered with rubber I or other dielectric for insulating during use and handling in filling and using; and the filling machine, not shown, being supported on insulators during the filling which is conducted as at present and under insulated conditions.

Fig. 7 is a diagram of the electrifying apparatus of Fig. 2 as applied to a beverage in a glass, $V^2$ or other open container or insulator supports not shown; and wherein the clamp CE is clamped to or takes the shape of an equivalent rod or plate P as the electrifier which is inserted in the liquid as shown, to electrify it positive advantageously.

Fig. 9 is a longitudinal section in diagram of one form of an injector or jet-pump conduit P for liquids; with connected tube or conduit P' for simultaneous inspiration of gas; with bundles of twisted wires B or the like as baffles within and in electrical touch with the tube P and P' respectively and with dielectric joint DJ' in P' near the junction with P; and with the electrifying apparatus of Fig. 2, applied as shown to the electrifier P for liquids, to electrify same with positive electricity; and advantageously, though not necessarily, with similar electrifying apparatus of Fig. 2 clamped as at CE' to the gas tube P' to electrify same negative; or vice versa, in some cases: and likewise filled with interlaced wires B' to constitute a baffle which will yet permit ready passage and flow therethrough of the gases; and advantageously having in the tube preceding the electrifier, conduit P' an ionizing device X not shown in detail such as a Roentgen ray apparatus and the like to ionize the gas, and which gas as it is forced or sucked through P' will have its positive ions grounded and further electrified negative when the tube P' is connected as shown with the negative pole of the D. C. supply, whose positive is earthed; or the ionizer X in such case, i. e., to attain negative ions, may advantageously be the well-known ultra-violet light ionizing apparatus.

As the positive liquid jet or vapor is forced through electrifier conduit P and through ensuing nozzle N, it sucks in the neutral or negative gas from P', and thereupon they are together mixed and compounded and forced into a neutral tube or compounding chamber V' through a narrow neck Y'; and thence through a zigzag tube V² on insulated supports I to give an additional mixing contact and into a suitable container not shown advantageously insulated.

When the gas tube P" is also electrified, then in addition to placing an insulating joint at DJ' in it, it is also advantageous in some cases to place an insulating joint DJ² between the electrifier liquid conduit P and the nozzle N, in order that the tube at Y and V' and V² be neutral. Without such dielectric joint DJ² the nozzle N is electrified like P, and is in fact part of the electrifier conduit. And similarly I utilize and electrify for like purposes, nozzles, without said DJ² insulator joint in the above or other known injectors or spraying devices, and either with or without the accompanying suction of gases; and where the nozzles are separate and distinct, I may insulate and similarly electrify the nozzles with the electrifier apparatus of Fig. 2. It will be understood that frictional electricity also results from the friction at the nozzles generally positive upon the liquid sprays and vapor flowing and injected therefrom; and therefore in some cases for such, I electrify the gas negative as described with my electrifier apparatus; and I may rely upon the friction to electrify the spray and either with or without the application of electrifying apparatus of Fig. 2.

Fig. 10 is a diagram of a longitudinal section of two parallel concentric tubes P and K; with the annular space E between the two constituting the electrifier conduit; and advantageously with a bundle of interlaced baffle wires B in the annular space as part of the electrifier; and with means not shown, of forcing a cooling or heating fluid, a dielectric such as oil, through the central tube K; and with the electrifying apparatus of Fig. 2 clamped to outer tube P.

Or in lieu of attemperating through the inner tube, I may use an attemperating coil K' around the electrifier conduit P; or I may use both.

It will be understood that the baffle wires B electrically connect the two tubes; and in effect also constitute resistance in the D. C. circuit which tend to increase difference of potential between the source and the points of contact in the electrifier conduit; and thereby facilitate the leakage of electrons or the like therefrom into the passing liquid or fluid in contact therewith.

Fig. 11 is a vertical section in diagram of an absorption tower and the like constituting an electrifier compounder or vessel V of conductor material on insulator supports I with means not shown for liquids to enter from supply pipe P at top and flowing by gravity over a succession of cascade electrifier plates or baffles B of conducting material; and meeting gases injected from bottom from pipe P" supported by and entering through insulator ring I and with dielectric joint DJ in P and likewise, though not shown, in an exit pipe L with cock at top to carry off gases not absorbed by the liquid, with exit pipes O and O' at bottom, with dielectric joints therein not shown, to withdraw the compound liquids; with the electrifying apparatus of Fig. 2 clamped to the conducting material at CE of the vessel V whence the electrical charges will spread to the cascade baffles or plates P and thence to the liquids flowing in thin streams thereover.

Fig. 12 is a vertical section in diagram of a centrifugal disk machine like a centrifugal disk emulsor machine or the like modified cream separator with details not shown, with a series of parallel disks or baffles B which may be flat or truncated cones with narrow passage ways or conduits between same and resting on each other at several points on edge and fixed around a central revolving spindle M; with a central passage way and entrance pipe P with valve cock for liquids through insulator ring I³ advantageously at the top of a fixed bowl vessel V³ on insulator supports I; with an entrance gas pipe P' with valve and cock entering through insulator ring I; with an exit pipe and cock O for withdrawing compound liquid from near the bottom and leading to suitable receptacle not shown; with an exit pipe and cock at top O' of side for withdrawing the compound vapors and leading to a suitable condenser therefor not shown; with the electrifying apparatus of Fig. 2 electrically connected with the disks, advantageously through clamp CE with brush H attached brushing and bearing upon the revolving spindle M, with insulator support, details not shown. Dielectric joints not shown are inserted in each of said pipes. When the spindle M with the attached disks B is rapidly revolved by ordinary present means as used with disk-type cream separators, details not shown, the valves of pipes P and P' opened and the liquids enter at P, and the gases at P'; the liquids are forced by centrifugal motion between the disks B' in very thin sheets and thereby close intimate contact attained and thereby electrified with same sign as the disks; and emerge therefrom as a spray into the surrounding bowl V³ and the spray is therein intimately mixed with the gases entering at P'; which are either neutral or may enter oppositely electrified as elsewhere herein described; and thereby intimate compounding of the gases and spray results; and the compound sprays condenses in part against the sides of the bowl $V^3$ and flow to the bottom and are withdrawn at O or some of the compound spray and vapor may be withdrawn through the exit pipe O' and led to and condensed in a suitable condenser not shown, and thence to suitable package receptacle. The bowl $V^3$ may in some cases be attemperated either by a surrounding attemperating coil not shown, or other well known means. It will be understood that other centrifugal machines are likewise adaptable to the same process.

I do not restrict the process to carbonating beverages; but, also apply it to sundry technical compoundings of $CO_2$ as for instance in the manufacture of sugar, for removing lime from the limed sugar cane juice; also in the manufacture of sundry carbonates especially white lead—sodium bicarbonate—alkali manufacture by the solvay or ammonia soda process,—and in the cryolite process in which $CO_2$ is used to decompose the sodium aluminate produced; and also for compounding with gases other than $CO_2$.

I claim:

1. An electric treatment of a carbonated beverage and the like, which consists in electrifying the beverage with one sign only under insulated conditions.

2. An electric treatment of a compound carbonated water and soda fountain beverage and the like, which consists in electrifying the carbonated water with one sign only, and thereafter blending such with fruit syrups and the like, as at present; all under insulated conditions.

3. An electric treatment in the process of carbonating a liquid beverage and the like, which consists, in electrifying the liquid with one sign only, prior to the carbonating, and thereafter conducting and completing the carbonating; all under insulated conditions.

4. An electric treatment in the process of carbonating a liquid, which consists in, prior to the carbonating, electrifying the liquid with one sign only, and separately ionizing and electrifying the gas with opposite sign only and with different potentials; and thereafter conducting and completing the carbonating; all under insulated conditions.

5. An electric treatment in the process of carbonating a liquid, which consists in separately ionizing and electrifying the gas with one sign only; and thereafter conducting and completing the carbonating; all under insulated conditions.

6. The process of compounding liquids with other materials, liquids, and gaseous, which consists in electrifying with one sign only, one of the liquids prior to the compounding and which is thereafter conducted and completed; and all under insulated conditions.

7. The process of preparing compounds of liquids with other components, liquids, and gases, which consists in electrifying one of the components positive; and separately electrifying another of the components negative and with different potentials; each prior to the compounding; and thereafter conducting and completing the compounding; all under insulated conditions.

8. An electric treatment in the process of compounding a liquid with other materials, liquid, and gaseous, which consists in electrifying one liquid component with one sign only; and another liquid component separately with opposite sign only and with different potentials; and then compounding the said two; and thereafter electrifying such product of the said two with one sign and separately electrifying a third component, gas, with opposite sign and different potential; and thereafter completing the compounding; all under insulated conditions.

9. In a process as described, the step of electrifying with one sign only a liquid component of a compound, which consists in bringing some portions thereof while the whole is in motion under insulated conditions, into physical contact with a conductor extension of one terminal of a direct current supply of a suitable voltage and amperage, the other terminal being earthed and with an increased difference of potential between the electric source and said contact extension; all under insulated conditions.

10. The process of electrifying a liquid and the like with one sign only, which consists in bringing same in suitable physical condition and under insulated conditions, into contact with a conductor conduit plate and the like, which is in series in a direct current circuit having its pole of the sign opposite to the above grounded, and of a suitable high voltage and amperage; and with an increased difference of potential between the electric source of supply and the said contact conduit plate and the like, over and above such, due to resistance of the circuit and of the source.

11. The process of increasing the electrification of a liquid, gas and the like, with one sign only, by contact thereof with an electric current circuit which consists in enlarging the size and shape of the non-grounded terminal lead line of the circuit into a conductor contact conduit plate and the like and simultaneously grounding the opposite sign and keeping the current constantly supplied; all under insulated conditions.

12. In a process as described, the step of electrifying with one sign only a liquid and gas compound which consists in moving the same under insulated conditions into physical contact with a resistor in the lead line from one terminal of a direct current supply circuit, the other terminal being earthed, the moving material not being in the said circuit; all under insulated conditions.

13. The process of preparing compounds of liquids and gases which consists in moving and bringing the same under suitable pressure and temperature into physical contact with each other upon the surface of a conduit plate and the like of catalytic conductor material electrically connected in series in the non-grounded terminal line of a D. C. supply circuit with a rheostat therein, the opposite terminal line being earthed; and thereafter completing the compounding; all under insulated conditions.

14. An electric treatment in the process of carbonating a beverage, which consists in electrifying before the carbonating the liquid with one sign only and separately ionizing and surcharging the gases with opposite sign and different potential; and thereupon conducting and completing the process; and all under insulated conditions.

15. A carbonated beverage in a dielectric container and having electrically adsorbed gases with increased amount of hydration compounds, of increased density and stability; and electrified with one sign only.

16. A carbonated beverage having electrically adsorbed gases and of increased stability in the retention of gases and prolonged foaming capability.

17. A liquid compound of liquids and gases having electrically adsorbed gases of increased stability in the retention of the gases when released from pressure in the atmosphere.

18. A stable compound of water solutions with increased amount of electrical hydration compounds.

19. In an apparatus for the purpose described a contacting conduit plate baffle and the like of conductor material; with a suitable closed compounding vessel, with inlet and outlet piping for liquids and gases with insulator supports; with means of suitably electrically connecting the contacting surfaces of the conduit and the like with one pole of a direct current supply of suitable high voltage and amperage; with means of simultaneously earthing the other pole; with means of bringing liquids and gases separately into contact with said contact surfaces of opposite polarity and of different potentials, and thereafter compounding the same all under insulated conditions.

20. In an apparatus as described, an electrifier compounding vessel and conduit thereto and therefrom; with insulator supports; with means of electrically connecting the vessel and conduit thereto, with a direct current supply circuit of suitable voltage and amperage; with means of earthing one pole of the D. C. supply; and of electrically connecting the other pole to the conductor baffle, conduit, plate, pipe and the like of the vessel in contact with material to be electrified; with means of bringing latter into such contact; with circuit breaking switch, voltmeter, ammeter and resistance in the circuit; with insulator supports for all connecting vessels pipes and all the apparatus; and with dielectric joints separating the connecting pipes from the electrifier vessel and the like; with means of attemperating the apparatus and materials, all under insulated conditions.

21. In an apparatus as described, an electrifying apparatus comprising a direct current supply circuit, with means of earthing one terminal thereof and means of connecting the other terminal to a conductor plate, conduit, baffle, vessel and the like for contact with materials to be electrically treated; with means of moving and renewing the materials under regulable pressure and temperature to and from the contact; with pole changer switch and circuit breaker, voltmeter, ammeter and resistance in the circuit; with insulator supports for all connecting vessels and piping.

22. In an apparatus of the nature described a vessel for compounding liquids and gases; with insulator supports; with separate conduits thereto for liquids and gases under regulated pressure, and temperature and under insulated conditions; with means of connecting the conduits separately with one terminal of a D. C. supply, of regulable voltage and amperage, the other terminal being earthed; with rheostat in the circuit; with means of withdrawing liquids and gases from the vessel; all under insulated conditions.

23. In an apparatus of the nature described, a closed vessel for compounding liquids and gases; with insulator supports; with means of spraying liquids into the vessel through a conduit having an insulator conductor nozzle connected with one terminal of a D. C. supply the other terminal being earthed; with means of attemperating said vessel and conduit; with means of simultaneously forcing ionized gas under regulated pressure into the vessel through a metal conduit electrically connected with a terminal of another D. C. supply circuit, its other terminal being earthed, whose polarity is opposite to and of different potential to above nozzle connection, of a D. C. supply, whose other terminal is earthed; with means of withdrawing the liquid compound and waste gases from the vessel; all under insulated conditions.

24. In an apparatus as described, a compounding vessel, with means of insulating same on dielectric supports; with means of electrically connecting the conductor parts thereof with one pole of a regulable duly controlled D. C. supply; with means of connecting the other pole of the D. C. supply to earth; all parts being on insulator supports.

25. In an apparatus as described, a liquid and gas supply conduit and the like of conductor material and comprising a section made of resistor material in electrical connection with one terminal of a D. C. supply, the other terminal being earthed, with means of bringing liquids and gases in contact with such section; under insulated conditions.

26. In an apparatus for the purpose stated, a solid catalytic conductor, conduit plate and the like insulated and in series connection with one terminal of a D. C. supply, the other terminal being earthed, and being part of a conductor conduit plate and the like for contacting thereon of liquids and gases, which liquids and gases are not in the said circuit.

27. In an apparatus for the purpose stated, a comminuted solid catalytic insulated conductor baffle and the like, in an insulated conduit pipe, connected in a D. C. circuit having one terminal earthed and in contact with and in the path of moving liquids and gases not in said circuit.

28. In an apparatus as described, an electrifier, baffle and the like of suitable conductor material, within a dielectric vessel with means of passing liquids and gases in contact therewith and through the vessel under insulated conditions; with means of electrically connecting the baffle to one terminal of a direct current supply the other terminal being earthed; with a rheostat in the circuit.

29. A dielectric container, with a conductor conduit therein for liquids and gases with means of electrically connecting the conduit with one pole of a D. C. supply the other terminal being earthed.

30. In an apparatus for the purpose stated, a resistor in series in a direct current supply circuit of suitable high voltage and amperage, having one terminal earthed, and in the form of a conduit permitting the passage under insulated conditions in contact therewith of a liquid, fluid, gas and the like.

31. In an apparatus as described a centrifugal radial-acting compounding vessel with centrifuging mechanism; with insulator supports; with separate conduits thereto for introducing and mixing and compounding therein liquids and gases; and means of withdrawing the compounds therefrom; with means of electrifying the conduits with opposite polarity, and of different potential, by connecting each with one terminal of separate direct current supply circuits, the other terminals being earthed.

32. In an apparatus for the purpose described, a revolving metal spindle of a centrifugal machine on insulator supports, the spindle being in contact with a fixed brush electrically connected with one pole of a direct current supply, the other pole being earthed.

33. In an apparatus as described a combination insulated gas electrifier conduit, with a separate and insulated liquid electrifier conduit and sprayer nozzle together projecting into a closed chamber of a vessel on insulator supports, with means of electrifying the gas conduit with a sign opposite to the liquid conduit and of different polarity and simultaneously forcing the spray and gas together under suitable pressure, temperature and insulated conditions into the said chamber with means of withdrawing liquids and gases from the said chamber, all under insulated conditions.

34. In an apparatus for the purpose described a dielectric vessel with means of electrically connecting a beverage therein with one terminal of a D. C. supply the other terminal being earthed.

35. In an apparatus as described a direct current supply circuit; with means of raising the voltage; with one pole grounded; with a rheostat, voltmeter and ammeter in the non-grounded terminal line; with a metallic conduit plate, vessel and the like, connected with the non-grounded terminal line with means of forcing under regulated pressure and temperature, liquids and gases into contact with said conduit plate and the like under insulated conditions; with insulator supports for all the apparatus.

36. In an apparatus for the purpose stated of electrifying a moving liquid and the like with one sign only from D. C. electric current source, means of electrifying by contact, in combination with means of increasing the difference of potential between the source and the contact points with additional resistance placed in series in the current circuit.

37. In an apparatus for electrifying a liquid, gas and the like with one sign by contact with an electric current supply circuit, the means of increasing the electrification which consists in providing the lead line of the circuit in the form of a conductor contact conduit, plate or the like constituting the contacting points and surface; with means of bringing the material into contact therewith under insulated conditions; with means of grounding the opposite sign; without diminishing the supply; and with means of insulation of the apparatus.

38. In an apparatus for the purpose stated of electrifying a material, liquid, gas and the like with one sign only, from direct current supply, means of bringing the material in suitable form under insulated conditions into contact with a conduit plate and the like, in series in a direct current supply; with means of grounding the sign thereof opposite to the above sign; with means placed in the current circuit of materially increasing the difference of potential between the source of electric supply and the said contact conduit plate and the like.

In testimony whereof I have hereto affixed my hand in the presence of two witnesses.

JACOB E. BLOOM.

Witnesses:
 ABR. I. SOLOMON,
 EMMA BLOOM.